Dec. 8, 1959   D. L. P. HAMILTON   2,916,539
ABOVE GROUND TAP ENCLOSURE FOR SUBTERRANEAN CABLE
Filed Nov. 7, 1956                                   2 Sheets-Sheet 1
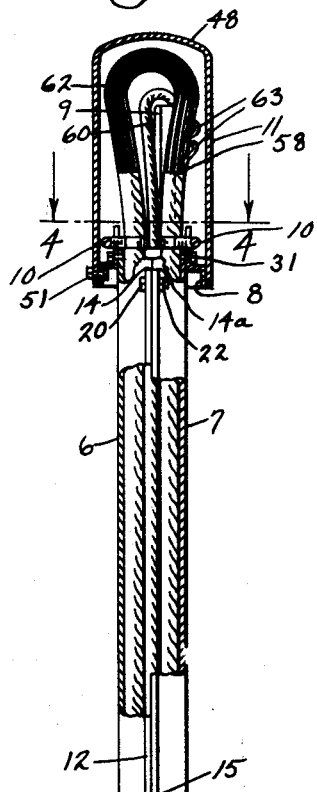
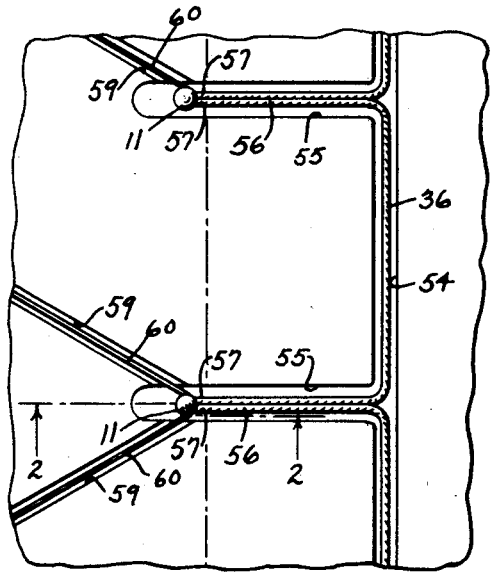
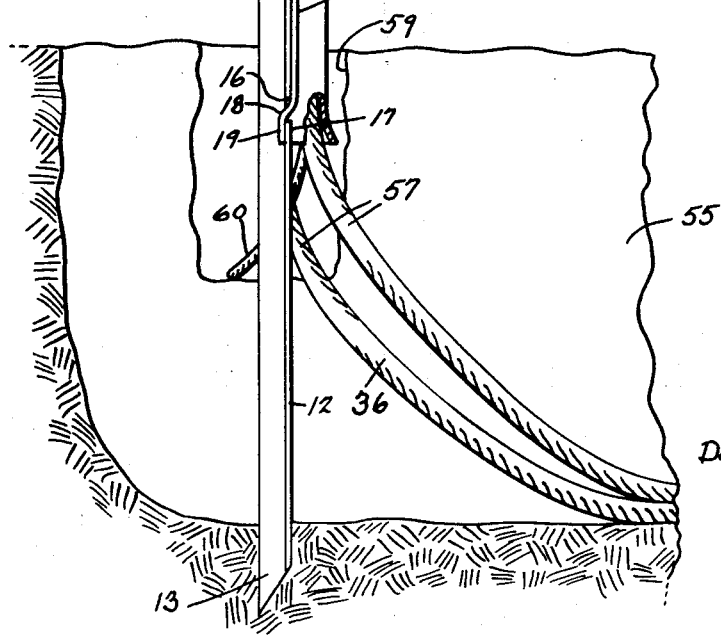
INVENTOR
Douglas L. P. Hamilton
BY
Quarles & French
ATTORNEYS

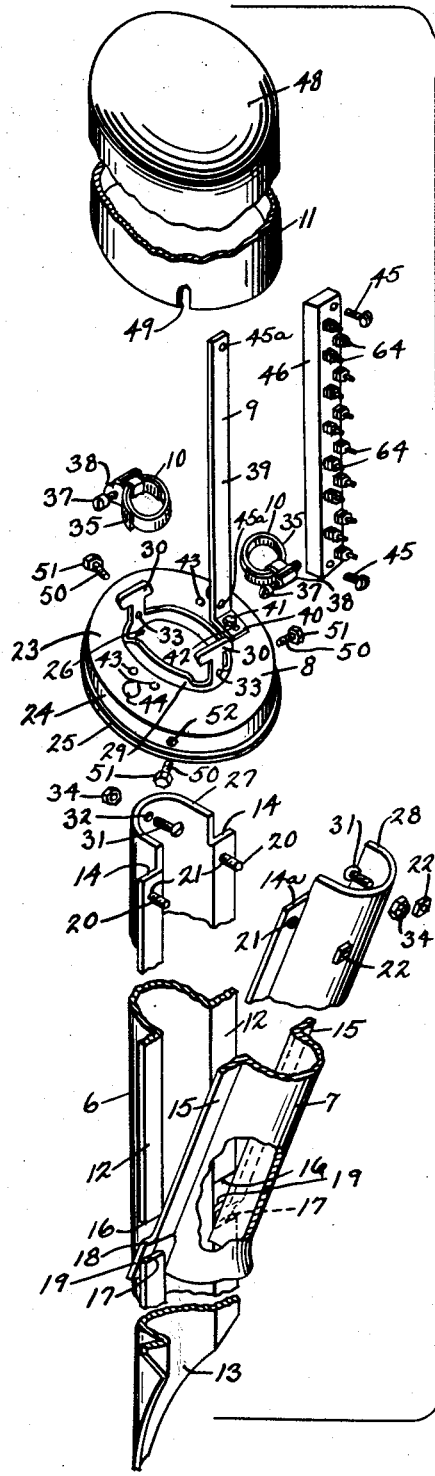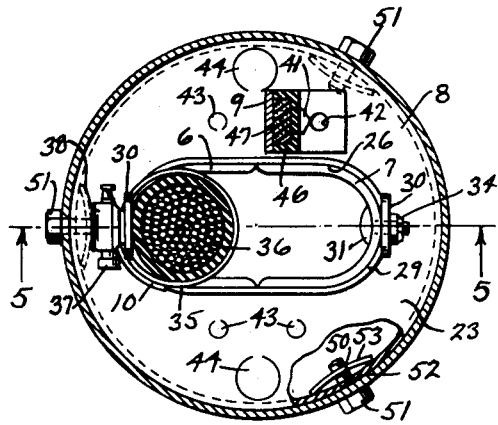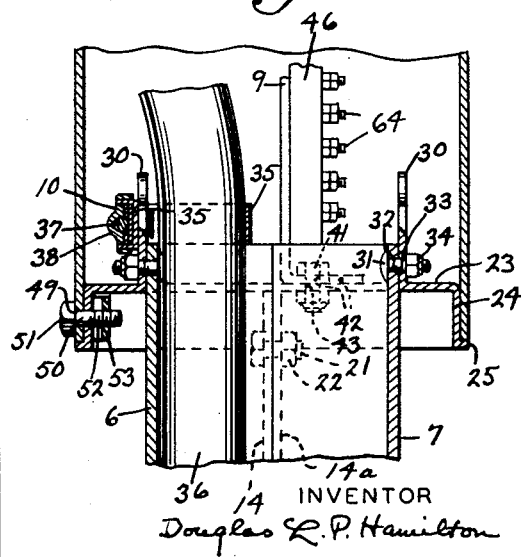

United States Patent Office 2,916,539
Patented Dec. 8, 1959

2,916,539

ABOVE GROUND TAP ENCLOSURE FOR SUBTERRANEAN CABLE

Douglas L. P. Hamilton, Milwaukee, Wis., assignor to Utility Products Co., Milwaukee, Wis., a corporation of Wisconsin Application November 7, 1956, Serial No. 620,921

6 Claims. (Cl. 174—38)

The invention relates to an above ground tap enclosure for subterranean cable.

In recent years cable has become available which makes it feasible and more economical in supplying telephone service, to place unprotected cable under ground with tapping loops at predetermined intervals above ground for connection to service lines running underground to the subscriber's phone or phones. Electric power may be distributed in a similar fashion. With such systems the above ground loops of the cable have heretofore been inconveniently housed or inadequately protected, and a suitable ground connection for grounded returns has not been provided in dependable form.

One object of the present invention is to provide a cable and service line tap housing structure for subterranean cable that provides adequate housing and a reliable ground.

A further object of the invention is to provide a tap housing structure in which any one of the parts may be replaced without interrupting service.

A further object of the invention is to provide a separable two part post serving an an enclosure for portions of the looped end of a cable and supporting a locking collar or cap which serves as a base for ground clamps and terminal connectors, one of the post parts being preferably interlocked to the other below grade to facilitate installation.

A further object of the invention is to provide a post enclosing portions of the looped end of the cable and to which the ground clamps for the cable may be electrically connected.

A further object of the invention is to provide a cable housing post for receiving the rising portions of a looped cable with the turn portion of the loop projecting above the post, providing three hundred sixty degrees of exposure of this portion of the cable for splicing and permitting pairs of conductors in the cable to be dropped off for splicing, tapping, or connection to binding posts on a terminal strip carried by the post.

A further object of the invention is to provide a base for the tap housing mounted on the top of the post which permits temporary connection of the service lines to the supply cable in case the ground about the post is frozen so that a temporary winter service line can be placed above ground.

A further object of the invention is to provide a base for the tap housing on the post, without access holes other than those of the knock-out type to prevent entrance of nest building insects.

The invention further consists in the several features hereinafter set forth and more particularly defined by claims at the conclusion hereof.

In the drawings:

Fig. 1 is a diagrammatic view of a cable and service line lay out;

Fig. 2 is a vertical cross-sectional view taken on the line 2—2 of Fig. 1, showing an enclosure embodying the invention, partly in full and partly in section;

Fig. 3 is a perspective exploded view of the parts of an enclosure embodying the invention;

Fig. 4 is a horizontal sectional view taken on the line 4—4 of Fig. 2;

Fig. 5 is a detailed vertical sectional view taken on the line 5—5 of Fig. 4.

Referring to the drawings, the enclosure includes a post comprising parts 6 and 7, a locking collar or housing base 8, a terminal strip support 7, ground clamps 10, and a covering member or housing 11.

The part 6 is a post member of sheet metal, generally channel shaped in cross section, having side flanges 12 and a scarfed or pointed end 13. The flanges 12 terminate below the top of this member to provide supporting shoulders 14.

The part 7 is a post member of sheet metal generally channel shaped in cross section having side flanges 15 adapted to abut the side flanges 12 of the member 6, said flanges terminating below the top of this member to provide shoulders 14A. While the post members 6 and 7 are shown as complementary sections, other sectional forms that provide an adequate cable receiving space may be used without departing from the invention.

The part 7 is shorter than the part 6 but extends below ground level as indicated in Fig. 2, and it, preferably to facilitate installation, is interlocked or hingedly connected thereto. For this purpose portions of the side flanges 12 of part 6 are cut out to provide gaps 16 and spaced shoulders 17, and the lower ends of the flanges 15 are separated from the body of the part 7 and bent at 18 to form laterally offset tongues 19 that may be inserted in the gaps 16 and then brought into abutting engagement with the rear faces of the flanges 12 at the same time the remainder of the flanges 15 are brought into engagement with the front faces of the adjacent flanges 12 of the member 6 as shown in Fig. 2. When so positioned, the upper portions of the adjacent flanges 12 and 15 may be secured together by a set of bolts 20 passing through apertures 21 in the flanges and provided with clamping nuts 22.

The locking collar or housing base 8 is of sheet metal formed to provide a circular top portion 23 and a depending annular flange 24 having a laterally projecting annular edge flange 25 forming a stop shoulder for the lower end of the housing 11. An opening 26 is provided in the top portion 23 of substantially the same shape as the cross section of the top portions 27 and 28 of the members 6 and 7, and this opening is surrounded by an upstanding flange 29 which at opposite ends projects upwardly to provide shouldered projections 30 for holding the ground clamps 10 in operative position. The circular portion of the base 8 rests on the shoulders 14 and 14A and is locked to the post sections by bolts 31 passing through apertures 32 in said sections and apertures 33 in said flange 29 and provided with clamping nuts 34.

The ground clamps 10 are of known form comprising a metal band 35 adapted to encircle the sheath of the cable 36 and be tensioned about the cable and the adjacent projections 30 by a feed screw 37 mounted in a fitting 38 to which one end of said band is secured, the other end of the band being apertured at intervals to engage said screw. The sheath of the cable 36 carries a conductive wrap to form a ground conductor engaged by the clamps 10.

The terminal strip support may be formed as shown of a metal bar 39 have an angled end 40 secured to the top portion 23 of the collar by a bolt 41 passing through one of the spaced apertures 42 in said end and one of the apertures 43 indicated in Fig. 4.

The apertures 43 are preferably of the knock-out type as are also the indicated temporary service drop holes 44 through which lines may be brought down out of the housing in the event the ground is frozen or for any other reason. By avoiding openings other than those occupied by fastenings or lines, insect access is minimized.

Any suitable terminal carrying member may be mounted on the support 9 and secured thereto by screw bolts 45 passing through the spaced holes 45A. In the drawings, the terminal carrying member is a channel member 46 of suitable insulating material with its legs adapted to abut one side of the support 39 and having a foam insulation filler 47 in the space formed between said support and member.

The hood 11 is a tubular metal member having a closed upper end 48 and provided with circumferentially spaced holes 49 in its lower end adapted to receive the shanks 50 of lock bolts 51 that extend through similarly spaced openings 52 in the flange 24 of collar 8 and engage yieldable metal nuts 53 whose corners abut the inner side of the flange 24 as shown in Fig. 4. The hood 11 being a closed end shell acts to retain air within itself so that in the event water should tend to come into the bottom of the hood as a result of flooding or severe rain storms, the air in the hood will under such circumstances resist the passage of water into the hood, and since the contact points 63 are well above the bottom of the hood as shown in Fig. 2, water will be prevented from reaching these contacts and shorting them out.

Referring to Fig. 1, a trench or slit 54 is dug or plowed and lateral outlet trenches 55 of approximately the same depth are dug, branching therefrom. The cable 36 is laid in the bottom of the trench and looped at intervals 56 to provide looped portions 57. A typical loop extends through a lateral trench and upwardly at the end of the lateral trench to bring the looped end 58 above the end of the post, one of the posts with the cable being shown in Fig. 2. With the cable so disposed, the post member 6 with the aid of its pointed end is driven into the ground below the trench 55 to anchor the same. One or more trenches or slits 59 usually of less depth than the trench 55 are dug or plowed in the ground between the subscriber's house and the post for receiving the subscriber's service line or cable 60 which is adapted to extend upwardly therefrom through the post and collar to a position where its leads may be connected with the proper terminal posts 61 on the member 46.

With the post member 6 in position, the cable 36 and the line cable 60 are brought alongside within the cavity of post member 6. The post member 7 is then hooked onto the member 6 as indicated in Fig. 3 and then swung inwardly to bring it to the position shown in Fig. 2 with the cables disposed between the parts of the post members 6 and 7. The members 6 and 7 are then clamped together by the bolts 20 and the cap or collar 8 is then brought down over the loop of the cable 36 and the upper end of the cable 60 and fitted down over the top portions 27 and 28 of the post members and secured thereto by the bolts 31 as previously described. The ground clamps 10 are then placed in position about the cable portions that form the loop and secured to the projections 30 as previously described. The trenches are filled up.

A portion of the sheath of the looped end 58 of the cable is removed as indicated at 62 in Fig. 2, and the lines in the cable to be used for the particular subscriber are separated to allow them to be bared as indicated at 63 in Fig. 2. Such bared portions are connected to the proper terminal posts 64 and the ends of the service cable 60, brought up through the post and the collar 8, are then connected to the posts 64 and thus to the bared portions of the cable 36. The cover or housing 11 is then brought down over and into operative engagement with the cap 8 and locked to said cap by the bolts 51. Other means for locking the cover to the cap may be used, if desired. It is to be noted that with the cover locked in position, access to the terminal connections is prevented and the post members 6 and 7 cannot be separated as they are locked to the cap by the bolts 31. then disposed within the collar.

Removal of the housing 11 permits access to the line connections, and under these conditions by the removal of the bolts 31, the base 8 may be disengaged from the ends of the post members while the lines or cable are still connected and by the removal of the bolts 20 either one of the post members may be removed and replaced with a new member, if necessary. Also since the opening 26 is large enough to allow the looped portion of the cable 36 and the support 9 with the cable and line connections thereto to be slipped through said opening when the support 9 is disconnected from the collar by removal of the bolt 45 and the ground clamps removed the collar 8 may be removed without interrupting service so that any one of the parts of the housing may be removed, if necessary, for replacement without interrupting the service to the subscriber.

It is to be noted that in some instances the cables 36 and 60 may be connected together without mounting them on a terminal member and its support.

I desire it to be understood that this invention is not to be limited to any particular form or arrangement of parts except insofar as such limitations are included in the claims.

What I claim as my invention is:

1. In an enclosure of the type described, the combination of a post adapted for mounting in the ground and formed of longitudinally cleavable sections extending below and above ground level and having the ends above ground substantially coterminus, a base member defining an aperture through which said sections extend and being further arranged to slidably receive and accommodate the looped end of a supply cable and a subscriber's cable, a housing removably secured to said base to form a cable junction space, means for securing said base member to said sections, and means intermediate the ends of said sections for securing said sections together, said cleavable sections of the post forming an enclosure arranged for receiving transversely insertable cable members extending from below ground into said junction space through said aperture.

2. The structure as defined in claim 1 in which the housing is an inverted, substantially elongated bell-shaped member and arranged to receive the junctions of the cable members, said junctions being spaced from said base member.

3. The structure as defined in claim 1, having terminal connecting means for the cable junctions removably secured to said base, the opening in said base permitting the slidable passage of said terminal connecting means therethrough so that when said housing is removed and said base is disconnected from said post, any one of the post sections and said base may be removed for replacement without interrupting service.

4. The structure as defined in claim 1 in which the cleavable post sections have abutting side flanges and the flanges of one of the post sections are interlocked with offset portions of the flanges of the other post section below ground level to provide a tiltably releaseable supporting connection for said last named post section on said first named post section.

5. The structure as defined in claim 1 in which said housing base has a shouldered lug and is conductively and directly connected to said post and a ground clamp extends around a portion of said supply cable and under said lug to provide a ground connection.

6. The structure as defined in claim 1, wherein the first named post member has abutting side flanges provided with slots disposed below ground and the second named post member has side flanges whose lower ends are formed as hooks for engaging over the shoulders formed by the lower ends of the slots in the first named post member to provide said tiltably releaseable supporting connection.

References Cited in the file of this patent

UNITED STATES PATENTS

| | | |
|---|---|---|
| 266,677 | Corbett | Oct. 31, 1882 |
| 272,833 | Goodfellow | Feb. 20, 1883 |
| 291,798 | Starr | Jan. 8, 1884 |
| 378,801 | Muckle | Feb. 28, 1888 |
| 477,218 | McLeod | June 21, 1892 |
| 2,198,368 | Lavarack | Apr. 23, 1940 |
| 2,420,478 | Hasselhorn | May 13, 1947 |
| 2,683,304 | Channell | July 13, 1954 |
| 2,798,113 | Koller et al. | July 2, 1957 |